United States Patent
Gui et al.

(10) Patent No.: US 6,548,140 B1
(45) Date of Patent: *Apr. 15, 2003

(54) THIN FILM MAGNETIC MEDIA FOR MINIMAL LUBRICANT TRANSFER TO HEAD DURING FLYING

(75) Inventors: Jing Gui, Fremont, CA (US); Bruno J. Marchon, Palo Alto, CA (US); Dallas W. Meyer, Burnsville, MN (US); Peter Segar, Burnsville, MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/702,325

(22) Filed: Aug. 22, 1996

(51) Int. Cl.[7] ............................................. G11B 5/725
(52) U.S. Cl. ..................... 428/65.4; 428/141; 428/212; 428/422; 428/694 TF; 427/131
(58) Field of Search ................. 428/65.4, 141, 428/212, 422, 694 TF, 900; 427/131

(56) References Cited

U.S. PATENT DOCUMENTS 5,292,585 A * 3/1994 Ohnoki et al. .............. 428/336
5,562,965 A * 10/1996 Gui et al. ................... 428/65.4
5,593,341 A * 1/1997 Gonnella et a. ............. 451/57

OTHER PUBLICATIONS

Encyclopedia of Polymer Science & Engineering vol. 16 (1991) p 379–381.*
A.M. Homola, C.M. Mate, G.B. Street, Overcoats and Lubrication for Thin Film Disks, Mrs Bulletin/Mar. 1990.
C. Mathew Mate, Application of disjoining and capillary pressure to liquid lubricant films in magnetic recording; J. Appl. Phys. 72(7), Oct. 1, 1992.
C. Hardie et al., Analysis and Performance Characteristics of The Seagate Advanced Air Bearing Slider, IEEE Transactions of Magnetics, vol. 30, No. 2, Mar. 1994.
Mark A. McHugh and Val J. Krukonis, Supercritical Fluids, Encyclopedia of Polymer Science and Engineering, vol. 16, 2nd Edition 1989 John Wiley & Sons, Inc.

* cited by examiner

*Primary Examiner*—Stevan A. Resan
(74) *Attorney, Agent, or Firm*—Kinney & Lange, P.A.

(57) ABSTRACT

A light abrasive texture is applied over the data zone of a thin film magnetic disc, while a surface texture of a second roughness is applied over the landing zone. A lubricant is applied over both the landing zone and the data zone. The lubricant is a high molecular weight PFPE lubricant which has been fractionated by supercritical fluid fractionation in carbon dioxide to exclude the fractions of low molecular weight and to exclude the fractions of very high molecular weight.

24 Claims, 6 Drawing Sheets

THIN FILM MAGNETIC MEDIA FOR MINIMAL LUBRICANT TRANSFER TO HEAD DURING FLYING

CROSS REFERENCE TO RELATED APPLICATION

This application claims the benefit under 75 U.S.C. §120 of Application Ser. No. 08/486,882 filed on Jun. 7, 1995, entitled "Vapor Lubrication of Fractionated Lubricant on Thin Film Discs", now U.S. Pat. No. 5,562,965.

BACKGROUND OF THE INVENTION

The present invention relates to magnetic discs used in computer disc drives, and, more particularly, to the use of texturing of a thin film magnetic disc surface and to processing of lubricant used on the thin film magnetic disc for reduced stiction associated with stop times of the disc drive.

Computer disc drives commonly use thin film media to store information in a high-density, high-reliability format. The magnetic layer in thin film media is typically provided by a cobalt alloy film. The cobalt alloy film may be applied at a thickness of around 500 Angstroms over a supporting substrate. The substrate may be nickel-phosphorous plated aluminum which may be coated with a chromium underlayer for the magnetic media.

While thin film media offer important advantages toward higher storage density, the cobalt alloy films are significantly less durable than films composed of the magnetic and alumina particles used in particulate media. To enhance the durability of the disc, a protective layer of a very hard material is applied over the cobalt alloy film. A typical protective layer is an overcoat of sputtered amorphous carbon about 150 Angstroms thick. The amorphous carbon overcoat structure can be thought of as a hybrid between diamond and graphite. Other materials which have been used for overcoats include sputtered ceramic zirconium oxide and amorphous films of silicon dioxide.

The overcoat surface is usually lubricated to further reduce wear of the disc due to contact with the magnetic head assembly. The lubricant is typically applied evenly over the disc in a molecularly thin film having a thickness from 10 to 50 Angstroms. Thicker films tend to be spun off by centrifugal forces. Slider-disc interaction, air shear and evaporation may also affect the amount of lubricant on a disc.

Disc surfaces have been textured to affect the tribology between the slider and the disc. A surface roughness of 50 to 350 Angstroms peak-to-valley is typical. The texturing can be provided by texturing of any of the disc layers. For instance, the overcoat layer may be applied over a smooth surfaced magnetic layer, with the overcoat layer being mechanically textured after it has been applied. Alternatively, the substrate may be mechanically textured prior to application of any of the covering layers. Each of the underlayer, magnetic layer and overcoat are typically applied by sputtering to provide a very even thickness. Accordingly, when the underlayer, magnetic layer and overcoat are applied over a textured substrate, the texturing is transmitted through each of these layers, and the resultant surface of the overcoat layer retains most of the texturing of the substrate.

Magnetic discs in a computer disc drive which use an air bearing slider have two discrete zones which may be defined based on how the slider of the magnetic head assembly travels over the disc surface. A "landing zone" is the zone where the slider containing the read/write transducer lands, rests while the disc drive is off, and takes off from when the disc guide is started up. A "data zone" is the zone where the slider flies over the disc and stores magnetic data. Lubricant is generally applied both to the landing zone and the data zone on the magnetic disc.

When the power is switched on in a disc drive, enough force has to be applied to the slider to overcome the static friction or "stiction" force on the slider. During the relatively low speeds encountered during takeoff and landing, the slider maintains almost constant contact with the disc. Lubricant over the landing zone is important for its contribution toward the stiction force and to minimize wear and drag force during takeoff and landing.

As the speed of the disc increases, the slider bears off the air in contact with the disc surface such that the magnetic head assembly becomes airborne. During use of the disc drive, the magnetic head assembly is designed to fly over the disc surface without contacting the disc. However, the magnetic head assembly occasionally contacts the disc during use of the disc drive. These in-flight contacts between the slider and the media occur infrequently, but at high speeds. Most of these contacts are caused by collision of the slider with media asperities, third bodies such as corrosion products, or other contaminant particles. The lubricant on the data zone minimizes wear and/damage to the disc due to these occasional contacts between the magnetic head assembly and the disc.

Perfluoropolyethers (PFPEs) are currently the lubricant of choice for thin film recording media. PFPEs are long chain polymers composed of repeat units of small perfluorinated aliphatic oxides such as perfluoroethylene oxide or perfluoropropylene oxide. As a class of compounds, PFPEs provide excellent lubricity, a wide liquid-phase temperature range, low vapor pressure, small temperature dependency of viscosity, high thermal stability, and low chemical reactivity. PFPEs also exhibit low surface tension, resistance to oxidation at high temperature, low toxicity, and moderately high solubility for oxygen. Several different PFPE polymers are available commercially, such as Fomblin Z (random copolymer of $CF_2CF_2O$ and $CF_2O$ units) and Y (random copolymer of $CF(CF_3)CF_2O$ and $CF_2O$) including Z-DOL and AM 2001 from Montedison, Demnum (a homopolymer of $CF_2CF_2CF_2O$) from Daikin, and Krytox (homopolymer of $CF(CF_3)CF_2O$). Fomblin Z and Y are prepared by photo-oxidation of tetrafluoroethylene and hexafluoropropylene, respectively and are random copolymers of indicated units. Krytox and Demnum are synthesized via base catalyzed polymerization of perfluoropropylene oxide and trimethylene oxide, respectively. See U.S. Pat. No. 3,242,218 and U.S. Pat. No. 3,665,041. Commercially available PFPEs generally have a very broad molecular weight distribution. Lubricants are available in a number of average molecular weights, such as 2000 a.m.u. (Z-DOL 2000 for instance), 6000 a.m.u. (Fomblin Z), etc.

In some cases, some or all of the PFPE lubricant molecules have been bonded to the surface of the disc. Bonding helps to reduce lubricant which may be lost due to spin-off, evaporation, or chemical displacement. It has also been theorized that bonding of the lubricant helps to lower stiction forces.

Different strategies have been employed for bonding the lubricant molecules to a disc surface to enhance lubricant performance. For instance, the molecules may be chemically bonded to the disc surface. The PFPE lubricant molecules may be terminated by reactive, functional end-groups, such as hydroxyl, carboxyl, or piperonyl. The end groups chemically react with the amorphous carbon overcoat to bond the lubricant to the disc surface. Similarly, ionically polar end groups may be used to bond the lubricant to the disc surface. Lubricant bonding schemes may also involve thermal treatment or exposure to ultra violet light.

With thin film magnetic media, decreasing head to media spacing is critical for higher storage densities. Present flying altitudes of magnetic head assemblies over the disc surface are usually in the 100–500 Angstrom range. Still lower flying altitudes are anticipated in the future. As flying altitudes are decreased, the tribology between the slider and disc surface becomes more and more important. While the tribology between a slider and a disc is a function of the properties of the substrate and all the deposited layers, the overcoat and the lubricant are of primary importance. The slider structure also greatly affects the tribology, and sliders are usually formed of fairly hard ceramics such as Mn—Zn ferrite, calcium titanate ($CaTiO_3$) and $Al_2O_3$—TiC.

Stiction is one of the most important and complex tribological phenomenon for disc drives. High stiction forces can lead the disc drive to fail, as the motor may not be strong enough to overcome the initial stiction. The amount of stiction is a function of storage time as well as the normal force between the slider and the disc. The time dependency associated with the storage time is accredited to lubricant migration toward points of contact between the slider and the disc surface, resulting in meniscus forces which increase slowly over time. The time dependency of stiction may also be the result of increased elastic deformation of contacting asperities between the slider and disc surface, as well as the result of slow diffusion of ambient species, mainly water, into the lubricated junctions followed by displacement of lubricant from the meniscus.

SUMMARY OF THE INVENTION

The present invention is a method and apparatus to dramatically reduce stiction over a thin film disc. A light abrasive texture applied over the data zone, while a surface texture of a second roughness applied over the landing zone. A lubricant is applied over both the landing zone and the data zone. The lubricant is preferably a high molecular weight PFPE lubricant which has been supercritically fractionated in carbon dioxide to exclude the fractions of low molecular weight and to exclude the fractions of very high molecular weight.

DETAILED DESCRIPTION OF THE PREFERRED EMBODIMENTS

Figure 1:
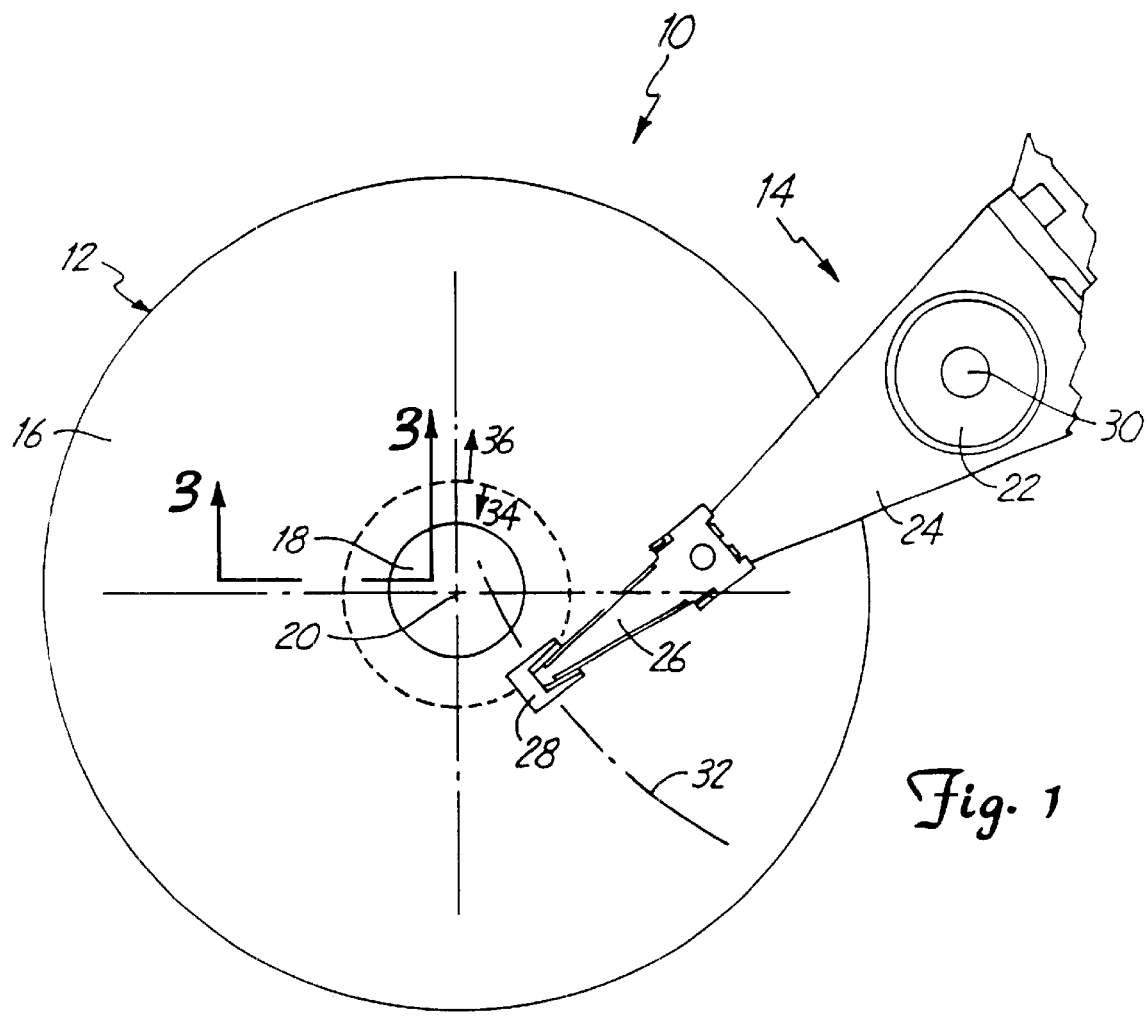
FIG. 1 is a top plan view of a computer disc drive.
Figure 2:
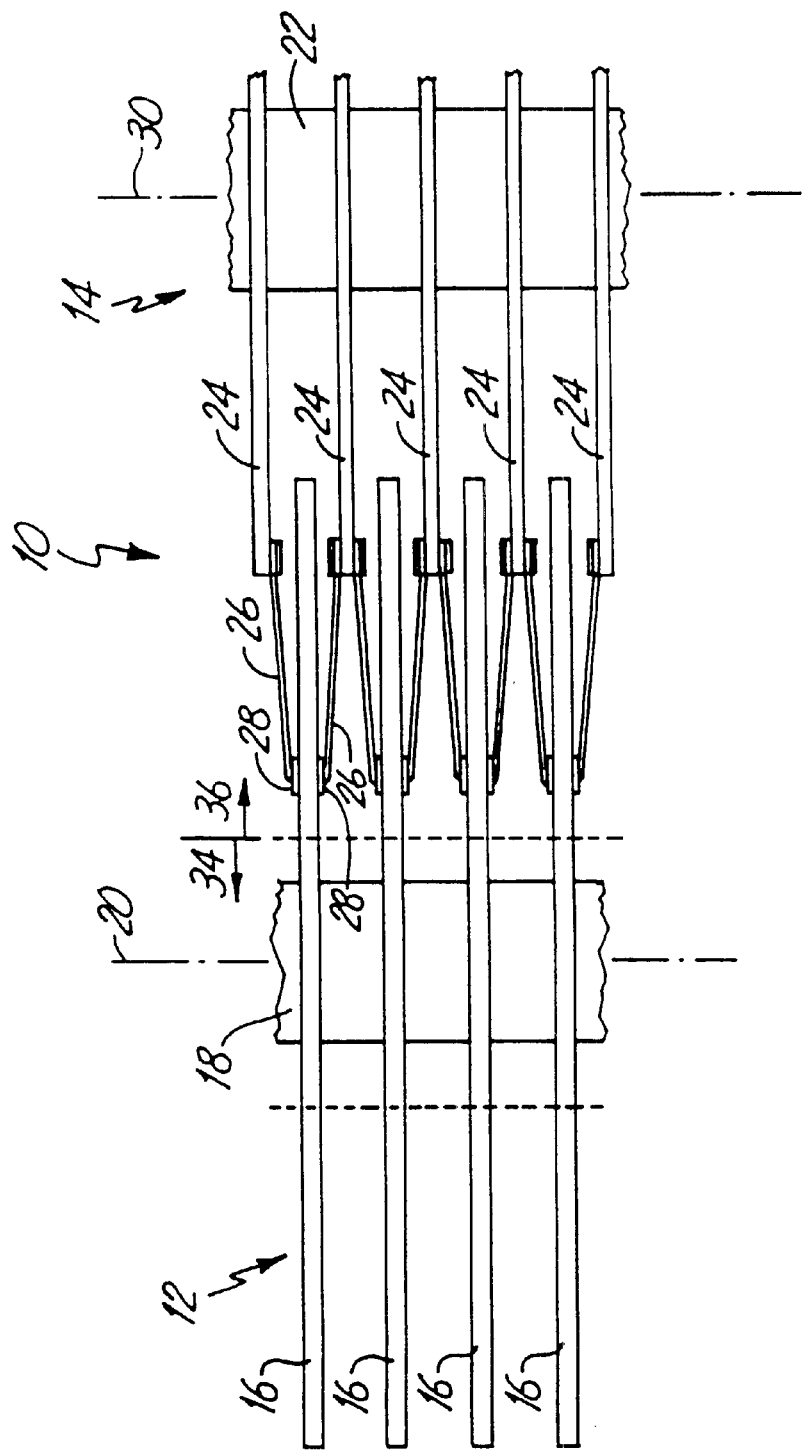
FIG. 2 is a side view of the computer disc drive of FIG. 1.

FIGS. 1 and 2 represent a disc drive structure 10. Disc drive assembly 10 includes disc pack 12 and E-block assembly 14. Disc pack 12 includes discs 16 stacked on drive spindle 18. During use of the disc drive 10, drive spindle 18 rotates discs 16 about axis 20. E-block assembly 14 includes servo spindle 22 and a plurality of actuator arms 24. Each actuator arm 24 carries one or two flexure arms or suspension arms 26. Each suspension arm 26 supports an air bearing magnetic head assembly 28 adjacent a surface of a disc 16. As disc 16 rotates about drive spindle 18 at a high speed such as 10 m/s or higher relative to magnetic head assembly 28, the aerodynamic properties of magnetic head assembly 28 cause assembly 28 to "fly" above the surface of disc 16. The flying height of magnetic head assembly 28 above disc 16 is a function of the speed of rotation of disc 16, the aerodynamic lift of the slider 28 of magnetic head assembly 28, and the spring tension in suspension arm 26.

E-block assembly 14 is pivotable about pivot axis 30. As E-block assembly 14 pivots, each magnetic head assembly 28 mounted at the tip of its suspension arm 26 swings through arc 32. As each disc 16 rotate beneath its respective magnetic head 28, this pivoting motion allows the magnetic head assembly 28 to change track positions on its disc 16. Each disc 16 has a landing zone 34 where the magnetic head assembly 28 lands, rests while the disc drive 10 is off, and takes off from when the disc drive 10 is started up. Each disc 16 has a data zone 36 where the magnetic head assembly 28 flies over the disc 16 and magnetically stores data.

Figure 3:
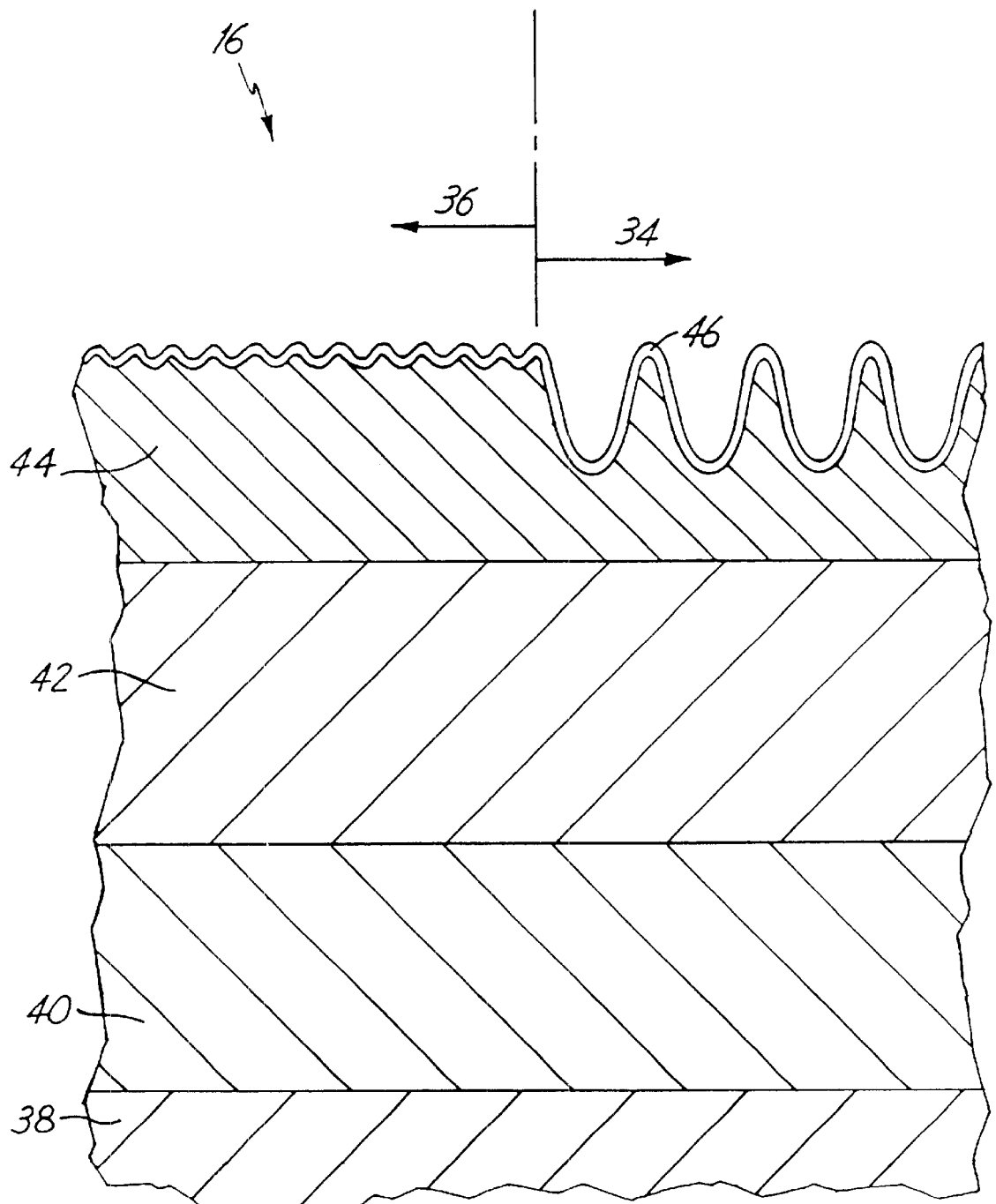
FIG. 3 is a greatly enlarged cross-sectional side view of the thin film magnetic disc of FIGS. 1 and 2, taken along line 3—3 of FIG. 1.

FIG. 3 illustrates the various layers of disc 16 at the changeover between landing zone 34 and data zone 36. Substrate 38 provides the structural integrity for disc 16, and is preferably nickel-phosphorous plated aluminum. Underlayer 40 provides a magnetically inert base for magnetic layer 42. Underlayer 40 is preferably chromium, and magnetic layer 42 is preferably a cobalt alloy film applied at a thickness of around 500 Angstroms. Overcoat 44 enhances the durability and wear resistance of the disc 16. Overcoat 44 preferably starts as a layer of sputtered amorphous carbon about 150 Angstroms thick.

Figure 4:
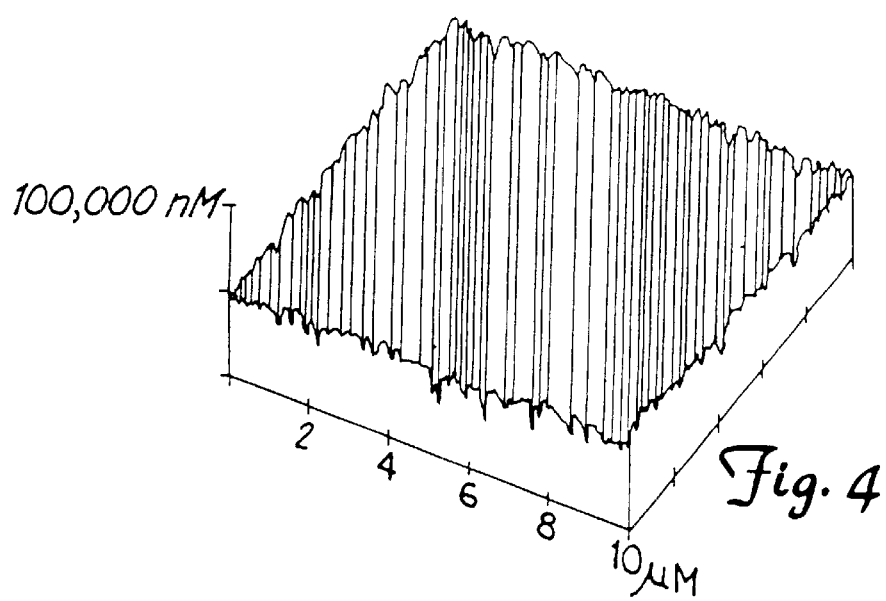
FIG. 4 is an atomic force microscope picture of a light mechanical texture on the data zone of the thin film magnetic disc of FIGS. 1 and 2.

Overcoat 44 is textured, but not with a single type of texture. The data zone portion 36 of overcoat 44 is textured with a light abrasive texture. The light abrasive texture over the data zone 36 should have a surface roughness of no less than 15 Angstroms peak-to-valley. To achieve a low flying altitude and adequate flying performance over the data zone 36, the light abrasive texture should preferably be less than about 50 Angstroms peak-to-valley. A surface texture for overcoat 44 of about 20 Angstroms peak-to-valley as measured with an atomic force microscope is shown in FIG. 4.

The landing zone 34 is mechanically textured at a different roughness, which is better suited for landing, storage and takeoff of the slider 28. The roughness of the landing zone portion 34 of overcoat 44 should have a roughness which is greater than the roughness of the abrasive texture over the data zone 36. Because the flying altitude and performance over the landing zone 34 is not critical to the storage density of the disc drive 10, the texture of the landing zone 34 can be greater than 50 Angstroms. The abrasive texture over the landing zone 34 preferably has a surface roughness of no less than 100 Angstroms peak-to-valley. For instance, the landing zone 34 may have a roughness average of between 150–250 Angstroms peak-to-valley.

A lubricant layer 46 overlies overcoat 44. Lubricant layer 46 further reduces wear of the disc 16 due to contact with the magnetic head assembly 28. The lubricant 46 is preferably applied in an unbonded layer of a molecularly thin film having a thickness of 10 to 30 Angstroms. The preferred lubricant 46 is an unbonded PFPE based lubricant which has been fractionated to remove the low molecular weight fractions.

The preferred method to fractionate PFPE is by supercritical fluid fractionation. Supercritical fluid fractionation is achieved by solubility differences between the molecules of various molecular weights within the polymer compound. Liquid polymer is continually fed to an extraction vessel where the polymer is dissolved in a supercritical fluid appropriate for the polymer. For PFPEs, supercritical carbon dioxide is an appropriate solvent. All of the oligomers in PFPEs are soluble in supercritical carbon dioxide, although the solubility of each oligomer is affected by the presence of the other oligomers. By subsequent stepwise pressure reduction of the steam leaving the extraction vessel, the PFPE is fractionated into low polydispersity fractions. The number of fractions and the polydispersity of each fraction is a function of the number of pressure reductions stages and the pressure reduction ratio in each stage. Other techniques to fractionate fluids include molecular distillation and fractional precipitation using antisolvents.

Figure 5:
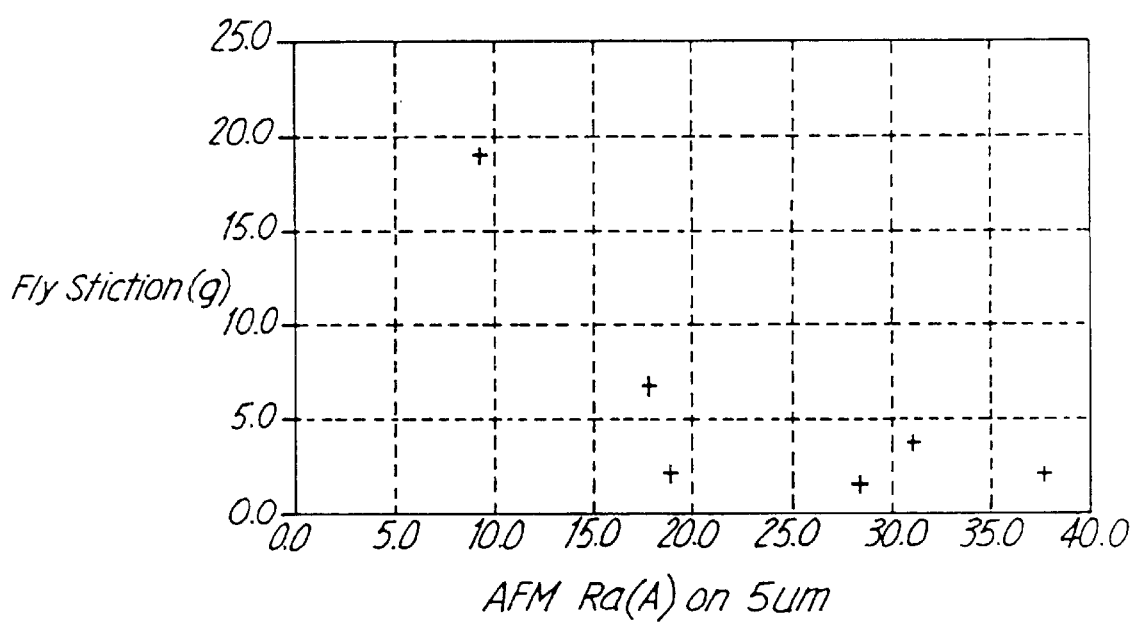
FIG. 5 is a graph of stiction versus the roughness average on the landing zone of the thin film magnetic disc of FIGS. 1 and 2 as measured by an atomic force microscope.

Discs 16 fabricated according to this invention have been found to be excellent in reducing stiction associated with the disc 16. FIG. 5 is a graph of measured stiction versus roughness average over the data zone 36. The stiction values were measured after 18 hours of flying and 2 hours of parking on each disc 16. The roughness average values were measured with an atomic force microscope. According to this data and on the disc drive system measured, a minimum level of roughness over the data zone 36 to obtain the stiction benefits of the present invention is a roughness average of 10 to 15 Angstroms peak-to-valley. This minimum value of surface roughness to obtain the stiction benefits of the present invention may depend somewhat upon the specific system (i.e., the particular slider configuration, the material of the disc layers, the material of the slider, the type of lubricant used, the designed flying altitude, etc.) being used.

Figure 6:
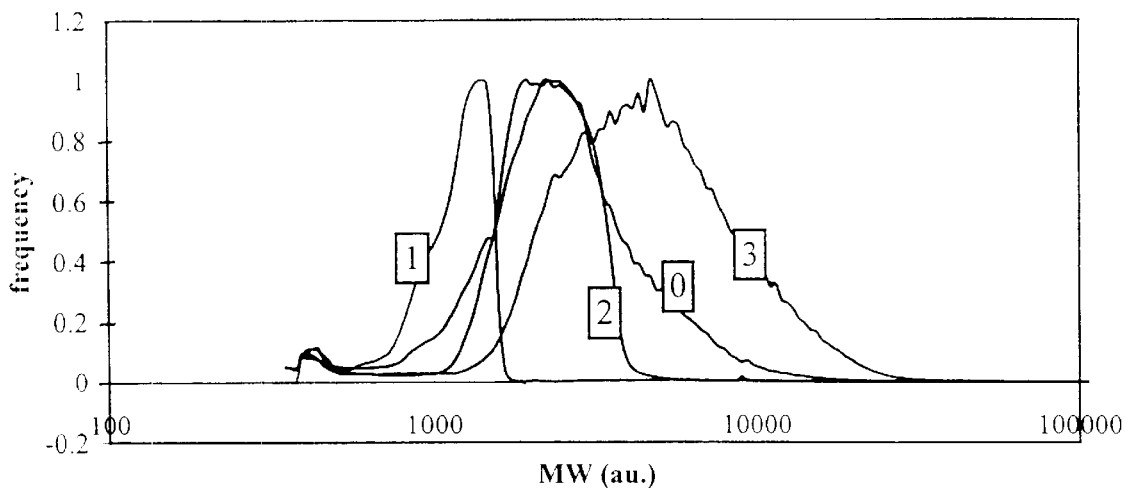
FIG. 6 is a chromatograph showing various supercritical fluid fractions of Z-DOL 2000.
Figure 7:
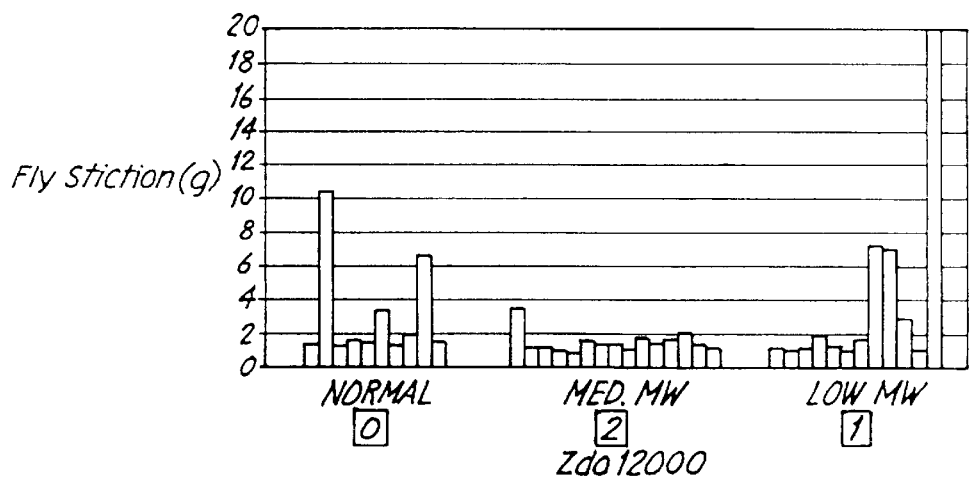
FIG. 7 is a graph of measured stiction for the three supercritical fluid fractionated molecular weights of Z-DOL 2000 shown in FIG. 6, showing several data points per molecular weight type.

FIGS. 6 and 7 exemplify the benefits obtained by fractionation of a Zdol 2000 PFPE lubricant. As shown in FIG. 6, the parent mixture ("0") of Zdol 2000 has a broad molecular weight distribution with an average molecular weight of about 2000 a.m.u. This parent mixture was fractionated by supercritical fluid fractionation to obtain three resultant fractions: a low molecular weight fraction ("1") of molecular weights less than about 1200 a.m.u., a medium molecular weight fraction ("2") of molecular weights between about 1200 and 4000 a.m.u; and a high molecular weight fraction ("3") of molecular weights over about 4000 a.m.u.

FIG. 7 shows experimental measurements of stiction after 18 hours of flying and 2 hours of parking based on the fraction of Zdol 2000 lubricant used. As indicated in FIG. 7, both the normal parent mixture and the low molecular weight fraction exhibited occasions of significant stiction events. The medium molecular weight fraction exhibits superior performance without the stiction problems associated with lubricants having a low molecular weight fraction.

Experimental results also indicate that the type of lubricant used and the method of applying lubricant can have a large impact on the average stiction observed. For instance, the Zdol lubricant produced better stiction results than either Demnum or AM2001, and Zdol 2000 produced better stiction results when it was not bonded to the disc surface by baking.

Figure 8:
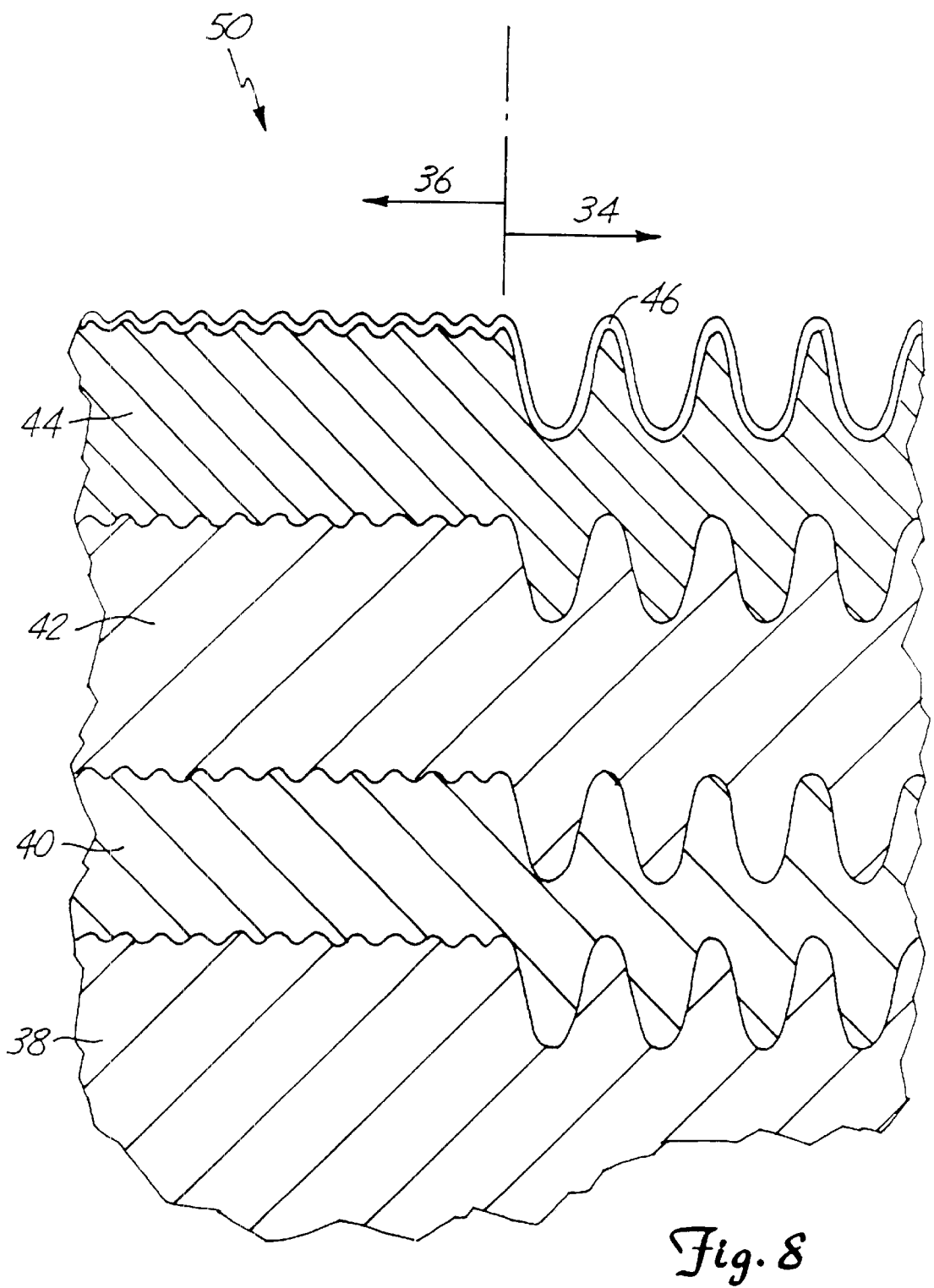
FIG. 8 is a greatly enlarged cross-sectional side view of an alternative embodiment of the present invention.

FIG. 8 illustrates the various layers of an alternative embodiment of a disc 50 in accordance with the present invention. The layers of disc 50 of FIG. 8 are identical to the layers of disc 16 of FIG. 3, except as to the location where the mechanical texturing is applied. In disc 50, the substrate 38 has been mechanically textured prior to sputtering application of underlayer 40, magnetic layer 42 and overcoat 44. The sputtering process produces very uniform thickness of layers 40, 42 and 44, and thus the surface of disc 50 exhibits the texturing applied to substrate 38 through these layers 40, 42 and 44. Applying the light mechanical texturing in substrate 38 may beneficially affect the grain growth and magnetic performance of magnetic layer 42 and disc 50.

While the exact reason or theory as to why the present invention produces markedly improved results in reducing stiction is not entirely known, it is believed that the surprisingly beneficial results are due to reduced lubricant transfer during flying. As the flying height becomes increasingly low to increase storage density, more and more physical and chemical interactions take place between the disc 16 and the magnetic head assembly 28 during flying. One of these interactions is the gradual transfer of non-bonded liquid lubricant 46 from the surface of disc 16 to the slider 28, which occurs when using a PFPE lubricant despite the low vapor pressure and other beneficial properties of PFPE lubricants. The transfer of liquid lubricant 46 is possibly due in part to a very high air pressure gradient adjacent to the slider 28. The transfer of liquid lubricant 46 may also occur in part due to the occasional high speed contact between the flying magnetic head assembly 28 and the surface of disc 16. The transfer of lubricant is related to the complex tribology between the magnetic head assembly 28 and the disc 16. Numerous factors may affect the amount and rate of lubricant transfer, such as the particular slider configuration, the material of the disc layers, the material of the slider, the type of lubricant used, the designed flying altitude, etc.

It is believed that this buildup of liquid lubricant 46 on the slider 28 while flying contributes significantly to stiction between the slider 28 and the disc 16. Liquid lubricant 46 can accumulate anywhere on the airborne slider 28, but typically confined near the trailing edge or in the cavity if the slider 28 has a cavity. When the slider 28 comes to rest after a power off, it is believed that the lubricant 46 migrates back to the head/disc gap. Excess lubricant 46 localized between the slider 28 and the disc 16 floods the interface and the contacting asperities, causing increased stiction.

It is believed that the lower molecular weight portion of the PFPE lubricant is largely responsible for the lubricant pickup on the head 28 during flying. The fractionation to exclude low molecular weight fractions of the PFPE lubricant thus lessens the lubricant pickup on the head 28 during flying. The light abrasive texture on the data zone surface of the disc 16 also helps to minimize lubricant transfer to the slider 28 during flying. Simultaneously, the light abrasive texture allows for a lower flying altitude of the slider 28 over the data zone 36 without affecting the flight characteristics of the slider 28. The heavier abrasive texture on the surface of the landing zone 34 of the disc 16 provides larger contacting asperities and helps prevent lubricant from flooding the interface between the slider 28 and the disc 16 during resting. Thus the present invention has been found to greatly reduce stiction associated with prior art thin film discs.

For particular disc drive systems, using the high molecular weight fraction of the lubricant may provide further beneficial results. With the high molecular weight fraction, the lubricant layer 46 exhibits less mobility on the surface of disc 16. For some disc drive systems, the lower lubricant mobility may adversely affect wear of the magnetic head assembly 28 and landing zone 34 during the contact which occurs during starting and stopping of the disc 16. However, coating of a magneto-resistive ("MR") head of the magnetic head assembly 28 with a carbon overcoat can substantially reduce these wear problems. For disc drive systems having a carbon overcoated MR head, use of a high molecular weight fraction of the PFPE lubricant may allow stiction problems to be avoided even when used on a smooth disc.

Although the present invention has been described with reference to preferred embodiments, workers skilled in the art will recognize that changes may be made in form and detail without departing from the spirit and scope of the invention. For instance, the present invention is applicable with all prior art thin film disc designs, including those discussed in the background section, as well as with many future thin film disc designs.

What is claimed is:

1. A thin film magnetic disc for a computer disc drive, the computer disc drive having an air bearing read/write head mounted on an actuator arm adjacent a surface of the thin film magnetic disc, the thin film magnetic disc comprising:
    landing zone on the thin film magnetic disc, the landing zone having a first roughness;
    a data zone on the thin film magnetic disc and located outward from the landing zone, the data zone being adapted to magnetically record information via the air bearing read/write head, the data zone having a second surface roughness which is less than the first surface roughness of the landing zone; and
    a lubricant over both the landing zone and the data zone, the lubricant having been fractionated to exclude fractions of high molecular weight relative to molecular weights of the lubricant prior to fractionation.

2. The thin film magnetic disc of claim 1 wherein the lubricant is a PFPE lubricant which has also been fractionated to exclude fractions of low molecular weight relative to molecular weights of the lubricant prior to fractionation.

3. The thin film magnetic disc of claim 2 wherein the lubricant is a PFPE lubricant which has been fractionated by supercritical fluid fractionation using carbon dioxide to exclude fractions of less than about 1200 a.m.u.

4. The thin film magnetic disc of claim 1 wherein the lubricant is a PFPE lubricant which has been fractionated by supercritical fluid fractionation using carbon dioxide to exclude fractions of greater than about 4000 a.m.u.

5. The thin film magnetic disc of claim 1 wherein the first roughness has a roughness average $R_a$ of greater than 100 Angstroms.

6. The thin film magnetic disc of claim 5 wherein the first roughness has a roughness average $R_a$ of between 150 to 250 Angstroms.

7. The thin film magnetic disc of claim 1 wherein the second roughness has a roughness average $R_a$ of at least 15 Angstroms.

8. The thin film magnetic disc of claim 1 wherein the second roughness has a roughness average $R_a$ of about 20 Angstroms.

9. The thin film magnetic disc of claim 1 wherein the lubricant is not thermally bonded to either the landing zone or the data zone.

10. A thin film magnetic disc for a computer disc drive, the computer disc drive having an air bearing read/write head mounted on an actuator arm adjacent a surface of the thin film magnetic disc, the thin film magnetic disc comprising:
    a landing zone defined on the thin film magnetic disc, the landing zone having a first surface roughness;
    a data zone defined on the thin film magnetic disc and located outward from the landing zone, the data zone being adapted to magnetically record information via the air bearing read/write head, the data zone having a second surface roughness; and
    a lubricant over both the landing zone and the data zone, wherein the lubricant is PFPE lubricant which has been fractionated to exclude fractions of high molecular weight relative to molecular weights of the lubricant prior to fractionation.

11. The thin film magnetic disc of claim 10 wherein the lubricant has also been fractionated by supercritical fluid fractionation using carbon dioxide to exclude fractions of less than about 1200 a.m.u.

12. The thin film magnetic disc of claim 10 wherein the second surface roughness has a roughness average $R_a$ of at least 15 Angstroms.

13. The thin film magnetic disc of claim 10 wherein the first surface roughness has a roughness average $R_a$ of greater than 100 Angstroms.

14. A method of manufacturing a thin film magnetic disc for a computer disc drive, the computer disc drive having an air bearing read/write head mounted on an actuator arm adjacent a surface of the thin film magnetic disc, the method comprising:
    providing a thin film magnetic disc adapted to magnetically record information via the air bearing read/write head;
    roughening a landing zone on the thin film magnetic disc with a roughness average $R_a$ of greater than 100 Angstroms;
    roughening a data zone on the thin film magnetic disc outward from the landing zone, with a roughness average $R_a$ of at least 15 Angstroms;
    fractionating PFPE lubricant into a first molecular weight fraction, a second molecular weight fraction and a third molecular weight fraction, the second fraction including molecular weights which are higher than molecular weights of the first molecular weight fraction and lower than molecular weights of the third molecular weight fraction; and
    applying the second molecular weight fraction to the roughened landing zone and the roughened data zone.

15. The method of claim 14 wherein the second molecular weight fraction is applied without thermal bonding.

16. The method of claim 14 wherein the lubricant is fractionated by supercritical fluid fractionation using carbon dioxide, and wherein the second molecular weight fraction excludes fractions of less than about 1200 a.m.u.

17. The method of claim 14 wherein the lubricant is fractionated by supercritical fluid fractionation using carbon dioxide, and wherein the second molecular weight fraction excludes fractions of greater than about 4000 a.m.u.

18. The method of claim 14, further comprising the step of excluding the first molecular weight fraction and the third molecular weight fraction from the thin film magnetic disc.

19. A thin film magnetic disc for a computer disc drive, the computer disc drive having an air bearing read/write head mounted on an actuator arm adjacent a surface of the thin film magnetic disc, the thin film magnetic disc comprising:
    a landing zone on the thin film magnetic disc, the landing zone having a first roughness;
    a data zone on the thin film magnetic disc and located outward from the landing zone, the data zone being adapted to magnetically record information via the air bearing read/write head, the data zone having a second surface roughness which is less than the first surface roughness of the landing zone; and a lubricant over both the landing zone and the data zone, the lubricant having been fractionated to exclude fractions of high molecular weight relative to molecular weights of the lubricant prior to fractionation, wherein the lubricant is a PFPE lubricant which has also been fractionated to excluded fractions of low molecular weight relative to molecular weights of the lubricant prior to fractionation, wherein the lubricant has been fractionated to exclude fractions of greater than about 4000 a.m.u., wherein the lubricant has also been fractionated by supercritical fluid fractionation using carbon dioxide to exclude fractions of less than about 1200 a.m.u., and wherein the second roughness has a roughness average $R_a$ of at least 15 Angstroms.

20. The thin film magnetic disc of claim 19 wherein the first roughness has a roughness average $R_a$ of greater than 100 Angstroms.

21. A thin film magnetic disc for a computer disc drive, the computer disc drive having an air bearing read/write head mounted on a actuator arm adjacent a surface of the thin film magnetic disc, the thin film magnetic disc comprising:

a landing zone defined on the thin film magnetic disc, the landing zone having a first surface roughness;

a data zone defined on the thin film magnetic disc and located outward from the landing zone, the data zone being adapted to magnetically record information via the air bearing read/write head, the data zone having a second surface roughness, wherein the second surface roughness has a roughness average $R_a$ of at least 15 Angstroms; and a lubricant over both the landing zone and the data zone, wherein the lubricant is PFPE lubricant which has been fractionated to exclude fractions of high fractionation, wherein the lubricant has been fractionated to exclude fractions of greater than about 4000 a.m.u., and wherein the lubricant has also been fractionated to exclude fractions of less than about 1200 a.m.u.

22. The thin film magnetic disc of claim 21 wherein the first surface roughness has a roughness average $R_a$ of greater than 100 Angstroms.

23. A method of manufacturing a thin film magnetic disc for a computer disc drive, the computer disc drive having an air bearing read/write head mounted on an actuator arm adjacent a surface of the thin film magnetic disc, the method comprising:

providing a thin magnetic disc adapted to magnetically record information via the air bearing read/write head;

roughening a landing zone on the thin film magnetic disc with a roughness average $R_a$ of greater than 100 Angstroms;

roughening a data zone on the thin film magnetic disc outward from the landing zone, with a roughness average $R_a$ of at least 15 Angstroms;

fractionating PFPE lubricant into a first molecular weight fraction wherein the first molecular weight fraction includes molecular weights of less than about 1200 a.m.u., a second molecular weight fraction wherein the second molecular weight fraction includes molecular weights of between about 1200 a.m.u. and 4000 a.m.u., and a third molecular weight fraction wherein the third molecular weight fraction includes molecular weights of greater than about 4000 a.m.u.; and applying the second molecular weight fraction to the roughened landing zone and the roughened data zone.

24. A method of manufacturing a thin film magnetic disc for a computer disc drive, the computer disc drive having an air bearing read/write head mounted on an actuator arm adjacent a surface of the thin film magnetic disc, the method comprising:

providing a thin film magnetic disc adapted to magnetically record information via the air bearing read/write head, the thin film magnetic disc having a landing zone and a data zone located outward from the landing zone;

roughening the landing zone with a landing zone surface roughness which is rougher than a data zone surface roughness on the data zone;

fractionating PFPE lubricant to exclude fractions of high molecular weight relative to molecular weights of the lubricant prior to fractionation and thereby form a fractionated lubricant; and applying the fractionated lubricant to the thin film magnetic disc both on the data zone and on the landing zone with the landing zone surface roughness which is rougher than the data zone surface roughness.

* * * * *